(12) United States Patent
Davies

(10) Patent No.: US 11,313,454 B2
(45) Date of Patent: Apr. 26, 2022

(54) LUBRICATION SYSTEM

(71) Applicant: ROLLS-ROYCE plc, London (GB)

(72) Inventor: Neil J. Davies, Ashbourne (GB)

(73) Assignee: ROLLS-ROYCE PLC, London (GB)

( * ) Notice: Subject to any disclaimer, the term of this patent is extended or adjusted under 35 U.S.C. 154(b) by 350 days.

(21) Appl. No.: 16/372,972

(22) Filed: Apr. 2, 2019

(65) Prior Publication Data

US 2019/0316672 A1 Oct. 17, 2019

(30) Foreign Application Priority Data

Apr. 17, 2018 (GB) ...................................... 1806239

(51) Int. Cl.
*F01D 25/20* (2006.01)
*F16H 57/04* (2010.01)
(Continued)

(52) U.S. Cl.
CPC ......... *F16H 57/0442* (2013.01); *F01D 25/20* (2013.01); *F01M 1/02* (2013.01); *F02C 7/36* (2013.01); *F02K 3/06* (2013.01); *F16H 57/043* (2013.01); *F16H 57/0479* (2013.01); *F16H 57/0486* (2013.01); *F16N 7/16* (2013.01);
(Continued)

(58) Field of Classification Search
CPC ............... F16H 57/0442; F16H 57/043; F16H 57/0479; F16H 57/0486; F16H 57/04; F01D 25/20; F01M 1/02; F02C 7/36; F02K 3/06; F16N 7/16; F16N 7/40; F16N 29/02; F16N 2210/02; F16N 2260/32; F05D 2260/40311; F05D 2260/98
See application file for complete search history.

(56) References Cited

U.S. PATENT DOCUMENTS 3,074,688 A * 1/1963 Demuth ................. F01D 25/20
                                                       415/175
8,307,626 B2 * 11/2012 Sheridan ................. F01D 25/20
                                                   60/39.08

(Continued)

FOREIGN PATENT DOCUMENTS

| GB | 207175 | 2/1925 |
| GB | 1193471 | 6/1970 |
| GB | 2234035 | 1/1991 |

OTHER PUBLICATIONS

Extended European Search Report, issued in EP Application No. 19163386.6, dated Aug. 23, 2019, pp. 1-6, European Patent Office, Munich, Germany.

(Continued)

Primary Examiner — Juan G Flores
Assistant Examiner — Joshua R Beebe
(74) Attorney, Agent, or Firm — Crowell & Moring LLP

(57) ABSTRACT

A lubrication system for a gas turbine engine, the system comprising: a gearbox, the gearbox comprising a sump; an oil tank; a primary gearbox lubrication system configured to pump oil from the oil tank to lubricate the gearbox with a gearbox primary feed; a secondary gearbox lubrication system, configured to lubricate the gearbox with oil from the sump when the oil level in the sump reaches a predetermined level; wherein the system is configured to increase the oil level in the sump to at least the predetermined level in response to a failure of the primary gearbox lubrication system.

19 Claims, 11 Drawing Sheets

(51) Int. Cl.
*F01M 1/02* (2006.01)
*F02C 7/36* (2006.01)
*F02K 3/06* (2006.01)
*F16N 7/16* (2006.01)
*F16N 7/40* (2006.01)
*F16N 29/02* (2006.01)

(52) U.S. Cl.
CPC .............. *F16N 7/40* (2013.01); *F16N 29/02* (2013.01); *F05D 2260/40311* (2013.01); *F05D 2260/98* (2013.01); *F16N 2210/02* (2013.01); *F16N 2260/32* (2013.01)

(56) References Cited

U.S. PATENT DOCUMENTS

| | | | |
|---|---|---|---|
| 8,491,436 | B2 | 7/2013 | Duong et al. |
| 9,404,381 | B2 | 8/2016 | NgyuenLoc et al. |
| 9,488,317 | B2* | 11/2016 | Wright .................. B60W 20/00 137/2 |
| 10,746,284 | B2* | 8/2020 | Gmirya ............... F16H 57/0456 |
| 2009/0277512 | A1* | 11/2009 | Barker ................ F16H 57/0447 137/389 |
| 2010/0212281 | A1* | 8/2010 | Sheridan .................... F02C 7/36 60/39.08 |
| 2011/0150655 | A1* | 6/2011 | Tietze ...................... F03D 80/70 416/170 R |
| 2013/0118593 | A1* | 5/2013 | Wright .................. B60W 20/00 137/2 |
| 2013/0133454 | A1* | 5/2013 | Barthel ..................... F16N 7/40 74/468 |
| 2014/0076661 | A1* | 3/2014 | Xu ........................ F16H 57/045 184/6 |
| 2015/0052873 | A1* | 2/2015 | Muldoon .................. F02C 7/36 60/39.08 |
| 2015/0308351 | A1 | 10/2015 | Sheridan |
| 2016/0032773 | A1* | 2/2016 | James ..................... F01D 25/20 416/170 R |
| 2016/0376923 | A1* | 12/2016 | Hutto, Jr. ................ F01D 25/16 415/175 |
| 2018/0073395 | A1* | 3/2018 | Parnin ................. F16H 57/0442 |
| 2018/0106360 | A1* | 4/2018 | Gmirya ............... F16H 57/0442 |

OTHER PUBLICATIONS

Great Britain search report dated Oct. 9, 2018, issued in GB Patent Application No. 1806239.8.

* cited by examiner

| Operation | Valve config | PGB Primary feed 105 | Crossover flow 134 | PGB Scav Valve 131 | PGB Scav Sol'n 132 | Crossover Flow Valve 133 | T/M oil feed from tank 118 | Comments | Options |
|---|---|---|---|---|---|---|---|---|---|
| Static | 1 | Not flowing | Not flowing | Closed | Not activated | Open | Not flowing | | |
| Starting | Trans 1-2 | Flowing | Flowing | Opening | Not activated | Closing | Flowing | Transient operation, dependent on oil supply pressures and valve activation pressures. Gulp will increase due to flowing secondary feed. | During starting the valves may be in the normal operating condition or multiple starting attempts will fill PGB without scavenging |
| Normal Running above idle (Figure 9) | 2 | Flowing | Not flowing | Open | Not activated | Closed | Flowing | Scav Valve and PGB secondary flow valve held by main PGB primary feed pressure | |
| PGB Pressure pump failure (Figure 10) | 1 | Not flowing | Flowing | Closed | Not activated | Open | Flowing | Scav Valve and PGB secondary valve controlled by loss of main PGB bearing feed pressure | |
| PGB Scav pump ONLY Failure | | | | | | | | Likely to look like a T/M side failure as oil will accumulate in the PGB and eventually stop the T/M flow. | |
| PGB side oil leak (slow) | 2 | Partial | Not flowing | Open | Not activated | Closed | Not flowing | Operation is 'normal' on PGB side. Either leak detected by loss of PGB oil pressure (as pressure pump failure) or loss of T/M oil pressure and shut down. | |
| PGB side oil leak (fast) (Figure 10) | 1 | Not flowing | Flowing | Closed | Not activated | Open | Flowing | Race between PGB side oil loss, valve response and T/M tank off position. | |
| T/M Side oil loss (fast or slow) (also scav pump failure) (Figure 11) | 2 | Flowing | Not flowing | Open | Not activated | Closed | Not flowing | PGB side unaffected as tank off take below T/M | On T/M Pressure loss the Sol'n valve could be activated and start to flood the PGB. Could also be linked to oil quantity |
| Oil tank oil loss (slow) | 2 | | | Same as T/M side oil loss | | | | T/M will lose oil supply first | On T/M Pressure loss the Sol'n valve could be activated and start to flood the PGB. Could also be linked to oil quantity |

FIG. 15

| Operation | Valve config | PGB Primary feed 105 | Crossover flow 134 | PGB Scav Valve 131 | PGB Scav Sol^n 132 | Crossover Flow Valve 133 | T/M oil feed from tank 118 | Comments | Options |
|---|---|---|---|---|---|---|---|---|---|
| Oil tank Loss (fast) | 1 | Same as PGB side fast oil loss | | | | | | T/M will lose oil supply first, Race between oil loss and valve response | On T/M Pressure loss the Sol^n valve could be activated and start to flood the PGB. Could also be linked to oil quantity |
| Inflight shut down (non oil system failure) (Figure 12) | 3 | Flowing | Not flowing | Closing | Activated | Closed | Flowing | | The Seconday flow valve could also be activated by the Sol^n valve if required |
| Windmilling (no core rotation) (Figure 13) | 1 | Not flowing | Not flowing | Closed | Not activated | Open | Not flowing | No flow as the core is not rotating. Flow will start if the core starts to rotate. | |
| Windmilling (with core rotation) | 1 | Flowing | Flowing | Closed | Not activated | Open | Flowing | Oil will migrate to the PGB. If core windmill is 'quick' there maybe oil pressure to operate in a partial state. If this is the case the bearing are being fed via the main PGB bearing feed | |
| Ground shuting down | Trans 2 - 1 | Flowing | Not flowing | Closing | Not activated | Opening | Flowing | Moves oil to the PGB as the engine runs down. Quantity dependent on rundown profile, quicker the better. | |
| AGB Drive failure | Trans 2 - 1 | Will look like a ground shut down | | | | | | | We could set the system up so that during a normal shut down the PGB is flooded. This would also help with ground windmilling and starting |
| Flame out | Trans 2 - 1 | Will look like a ground shut down | | | | | | | |
| Inflight windmill start (core rotating) | Trans 1 - 2 | Will look like ground start | | | | | | | |
| Inflight Starter assist (core static) | Trans 1-2 | Will look like ground start | | | | | | | |

*FIG. 16*

LUBRICATION SYSTEM

CROSS-REFERENCE TO RELATED APPLICATIONS

This specification is based upon and claims the benefit of priority from United Kingdom patent application Number GB 1806239.8 filed on Apr. 17, 2018, the entire contents of which are incorporated herein by reference.

BACKGROUND

Technical Field

The present disclosure relates to a lubrication system, and more particularly to a lubrication system for a gearbox of a gas turbine engine.

Description of the Related Art

In a gas turbine engine, a turbine that is downstream of a combustor extracts mechanical work from fluid downstream of the combustor. The turbine is mechanically coupled to a compressor that is upstream of the combustor by a core shaft, so that the turbine drives the compressor. The compressor and the turbine are provided in a region of the engine that is termed the engine core.

In a geared turbofan engine, a gearbox is provided. The gearbox typically couples the core shaft to a fan which is upstream of the engine core. It is known to use a reduction gearbox to reduce the angular speed of rotation of the fan, relative to the core shaft. This can result in improved efficiency. It may also be possible for a gearbox to couple a core shaft to a turbine which is downstream of the core shaft, thereby allowing a different rotational speed for the turbine, relative to the core shaft.

The gearbox is a safety critical part of the engine, since failure of the gearbox will result in a loss of drive to the fan, which is responsible for the majority of thrust from the engine. Furthermore, a loss of lubricant to the gearbox might result in seizing of the gearbox and hence seizing of the fan, introducing significant drag on the aircraft. It is important that the supply of lubricant (e.g. oil) to the gearbox is reliable, both for safety and to avoid wear and damage to bearings of the gearbox in the event of a failure of some kind.

U.S. Pat. No. 8,491,436 discloses an uninterruptible oil supply for a planetary gearbox.

The present disclosure provides a lubrication system that overcomes at least some of the problems of known lubrication systems or at least provides a useful alternative to such lubrication systems.

SUMMARY

According to a first aspect, there is provided a lubrication system for a gas turbine engine, the system comprising: a gearbox, the gearbox comprising a sump; an oil tank; a primary gearbox lubrication system configured to pump oil from the oil tank to lubricate the gearbox with a gearbox primary feed; and a secondary gearbox lubrication system, configured to lubricate the gearbox with oil from the sump when the oil level in the sump reaches a predetermined level; wherein the system is configured to increase the oil level in the sump to at least the predetermined level in response to a failure of the primary gearbox lubrication system.

The system may further comprise: a gearbox primary feed pump configured to pressurise the gearbox primary feed with oil from the oil tank; and a gearbox scavenge pump configured to pump oil from the gearbox sump to the oil tank along a scavenge flow.

The system may further comprise a gearbox scavenge valve that has an open position, in which oil flows through the gearbox scavenge path to return to the oil tank, and a closed position, in which oil is blocked from returning to the oil tank from the gearbox through the gearbox scavenge path. The gearbox scavenge valve may be configured to close in response to the pressure of the gearbox primary feed falling below a predetermined level.

The system may further comprise a gearbox scavenge control valve with an open position in which the gearbox scavenge control valve communicates oil pressure from the gearbox primary feed to a control port of the gearbox return scavenge valve and a closed position in which the gearbox scavenge control valve blocks oil pressure from being communicated from the gearbox primary feed to the control port of the gearbox scavenge valve.

The gearbox scavenge control valve may be operable to switch between the open and closed positions in response to an electronic signal.

The system may further comprise a turbomachinery lubrication system configured to lubricate turbomachinery of the gas turbine engine with a turbomachinery feed. The system may be configured to supply a crossover flow from the turbomachinery feed to increase the oil level in the sump in response to a failure of the primary gearbox lubrication system.

The system may further comprise: a turbomachinery feed pump configured to pressurise the turbomachinery feed with oil from the oil tank; and a turbomachinery scavenge pump configured to pump oil from the turbomachinery to the oil tank along a turbomachinery scavenge flow.

The system may further comprise a crossover flow valve configured to block crossover flow from the turbomachinery feed to the gearbox in a closed position, and to communicate the crossover flow from the turbomachinery feed to the gearbox in an open position. The crossover valve may be configured to open in response to the pressure of the gearbox primary feed falling below a predetermined level.

The secondary gearbox lubrication system may comprise a scoop attached to a rotating part of the gearbox (e.g. a carrier of a planetary gearbox). The gearbox may comprise a planetary gearbox. The planetary gearbox may comprise a carrier, a ring gear, a sun gear and at least two planet gears (e.g. three or four).

The carrier may comprise an oil channel and a secondary oil channel. The oil channel may be configured to receive a gearbox primary oil feed and a secondary oil feed from the secondary oil channel at a first location, and to provide oil to a planet gear bearing at a second location. The second location may be radially further from an axis of rotation of the carrier than the first location.

According to a second aspect, there is provided a gas turbine engine for an aircraft comprising: an engine core comprising a turbine, a compressor, and a core shaft connecting the turbine to the compressor; a fan located upstream of the engine core, the fan comprising a plurality of fan blades; a lubrication system according to the first aspect, wherein the gearbox receives an input from the core shaft and outputs drive to the fan so as to drive the fan at a lower rotational speed than the core shaft.

The turbine may be a first turbine, the compressor may be a first compressor, and the core shaft may be a first core shaft. The engine core may comprise a second turbine, a second compressor, and a second core shaft connecting the second turbine to the second compressor. The second turbine, second compressor, and second core shaft may be arranged to rotate at a higher rotational speed than the first core shaft.

According to a third aspect, there is provided a method of lubricating a planetary gearbox of a gas turbine engine, the method comprising: in response to failure of a primary gearbox oil feed, causing an oil level in a sump of the planetary gearbox to increase; and lubricating a journal bearing of the planetary gearbox with oil from the sump when the level has reached or exceeded a predetermined level.

Lubricating the planetary gearbox may comprise using a scoop attached to a carrier of the planetary gearbox to collect oil from the sump.

Lubricating the planetary gearbox may comprise splash feeding the oil onto journal bearings of the planetary gearbox.

Causing an oil level in the sump to increase may comprise operating at least one valve to reduce an oil scavenge flow from the planetary gearbox and/or to provide an additional oil flow to the planetary gearbox.

The additional oil flow to the gearbox may originate from an oil pump that does not pressurize the primary gearbox oil feed.

Causing an oil level in the sump to increase may comprise diverting oil from a turbomachinery lubrication system to the planetary gearbox.

The method may comprise using a lubrication system according to the first aspect to perform the method.

The features of each aspect may be combined with those of any other aspect, including any of the optional features thereof. The features of each aspect may be combined with any of the features mentioned below with reference to a gas turbine engine.

DESCRIPTION OF THE DRAWINGS

Embodiments will be described by way of example only with reference to the accompanying drawings, in which:

FIGS. 15 and 16 are tables explaining the operation of the lubrication system described with reference to FIGS. 9 to 13 in a variety of states.

DETAILED DESCRIPTION

Figure 1:
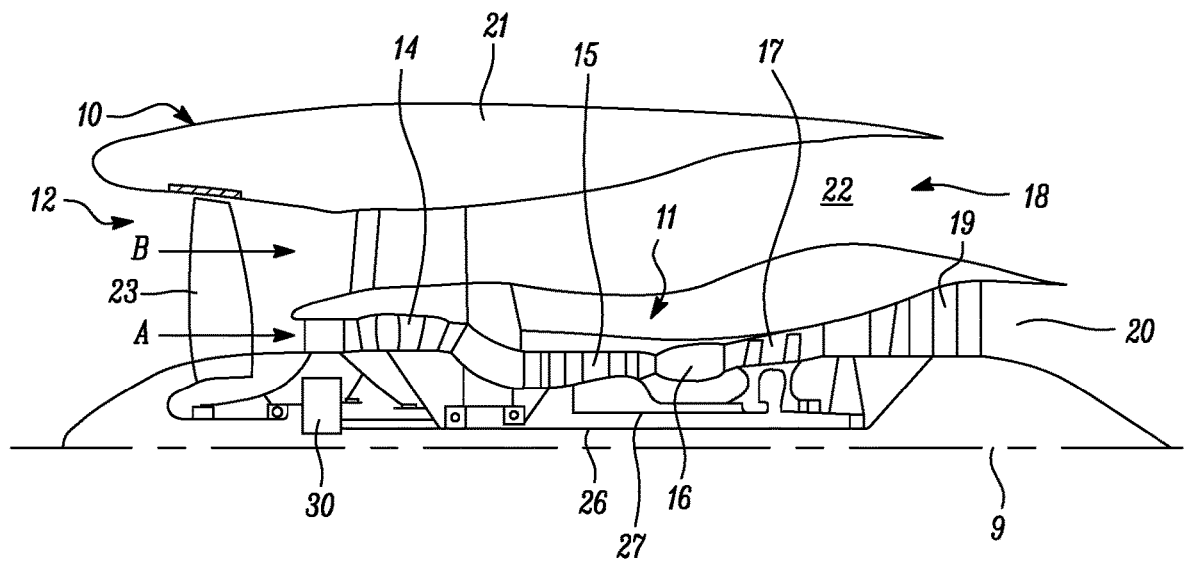
FIG. 1 is a sectional side view of a gas turbine engine.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed). In some alternative embodiments the core shaft may receive drive from a turbine without the core shaft also being connected to a compressor.

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

In some embodiments, the or each turbine may be a centrifugal turbine. In some embodiments, the or each compressor may be a centrifugal compressor. Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.3, 0.31, 0.32, 0.33, 0.34, 0.35, 0.36, 0.37, 0.38, 0.39 or 0.4 (all units in this paragraph being) $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31 or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of from 13 to 16, or 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55° C. Purely by way of further example, the cruise conditions may correspond to: a forward Mach number of 0.85; a pressure of 24000 Pa; and a temperature of −54° C. (which may be standard atmospheric conditions at 35000 ft).

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example two or four) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The low pressure turbine 19 drives the low pressure compressor 14 via shaft 26. The fan 23 generally provides the majority of the propulsive thrust. The epicyclic gearbox 30 is a reduction gearbox.

Figure 2:
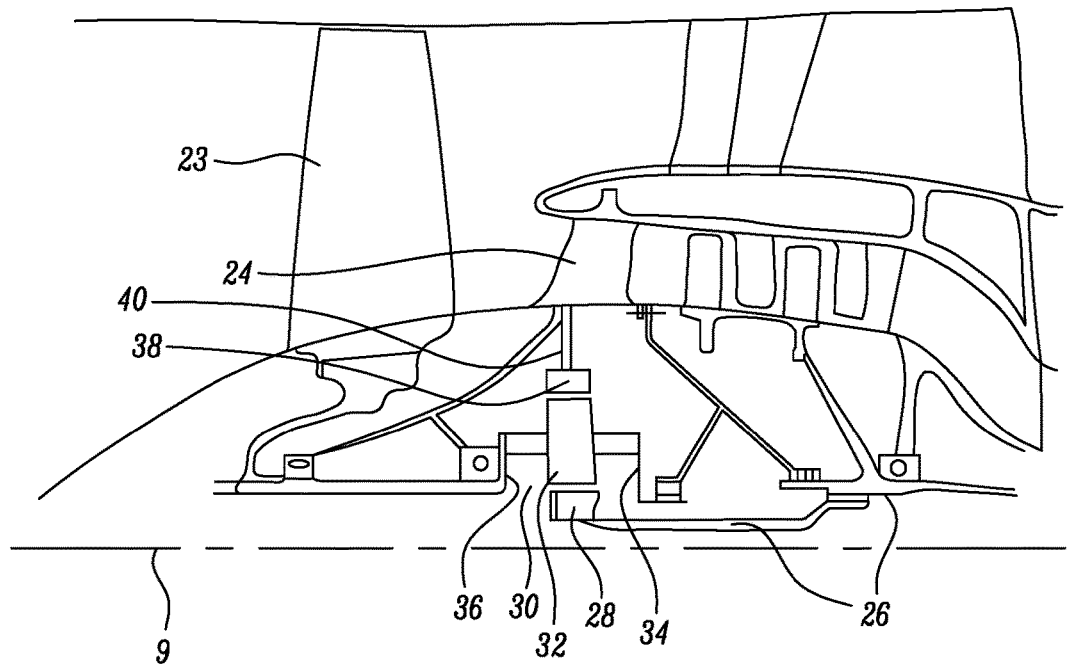
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage. The term "PGB" as used herein is a reference to planetary gearbox. It will be understood that other types of gearbox may also be used.

Figure 3:
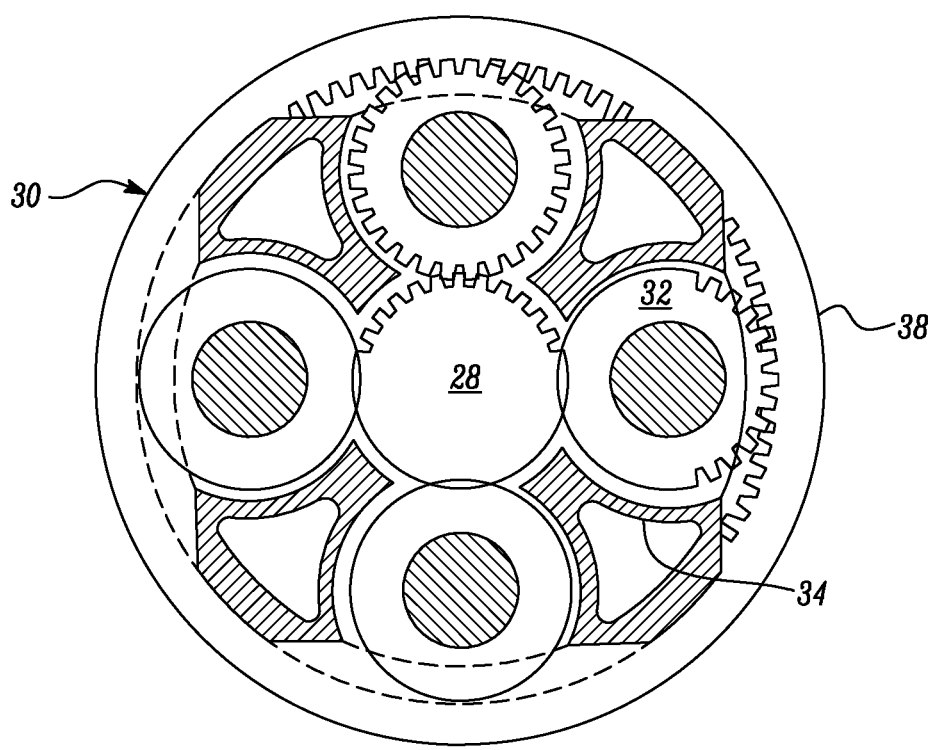
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32. The planet gears 32 are supported for rotation on bearings. The bearings may be of any suitable kind, such as journal bearings or rolling element bearings.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
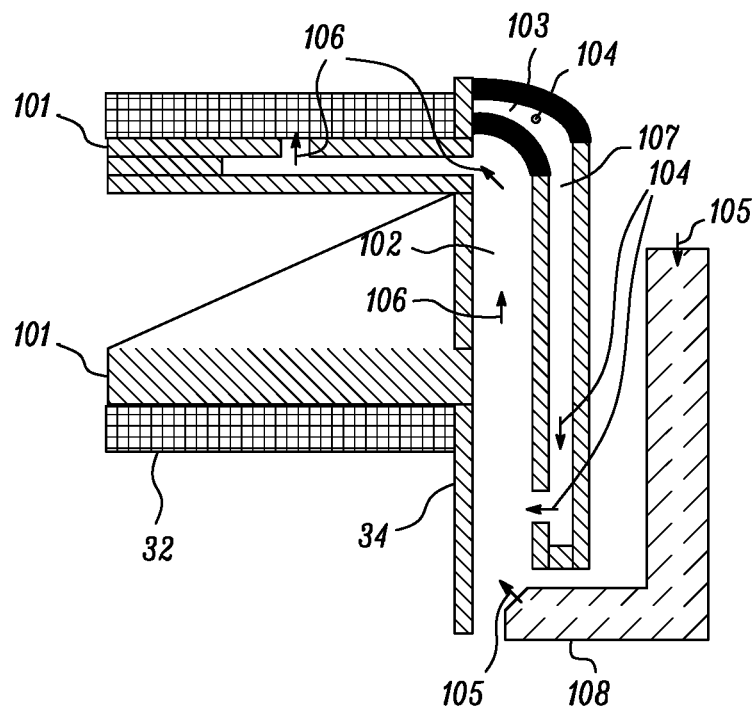
FIG. 4 is a schematic cross sections illustration of a lubrication arrangement for an epicyclic gearbox.

FIG. 4 is a schematic cross sectional illustration of a lubrication arrangement for an epicyclic gearbox with a planet gear 32 on a journal bearing pin 101 of a carrier 34. Lubrication (e.g. oil) must be provided to the interface (i.e. journal bearing) between the bearing pin 101 and the inner surface of the planet gear 32. An oil channel 102 is provided for feeding a flow of oil 106 to the journal bearing, via an opening in the bearing pin 101. The flow of oil through the channel 102 is radially outward, and may thereby be driven by centrifugal forces arising from rotation of the carrier 34.

The oil channel 102 is provided with a primary flow opening at an end of the channel 102 that is closest to the centre of rotation of the carrier 34, for receiving a primary oil flow 105. The oil channel 102 is also configured to receive a secondary flow 104 of oil.

The secondary flow 104 is provided in response to a failure of the primary oil flow 105, as will be explained more fully hereinafter.

A secondary oil channel 107 is configured to provide the secondary flow 104 to the oil channel 102. The secondary oil channel 107 is fed by a scoop 103. The scoop 103 is configured to collect oil from a sump of the gearbox when the oil level in the sump is deep enough for the scoop 103 to reach it. A secondary flow opening is provided in the secondary oil channel 107 at the scoop 103 to receive oil therefrom.

The illustration of the scoop in FIG. 4 is schematic only—the scoop 103 may be positioned further radially outward (from the centre of rotation of the carrier 34) from the planet gear 32.

A primary oil jet 108 is provided for supplying a primary gearbox oil flow 105 to the primary flow opening in the oil channel 102. There may be multiple primary oil jets 108, and these may be spaced at different angular radial locations about the carrier 34. Similarly, each planet gear 32 may have a similar lubrication arrangement (comprising oil channel 102, scoop 103 and secondary oil channel 107).

Figure 5:
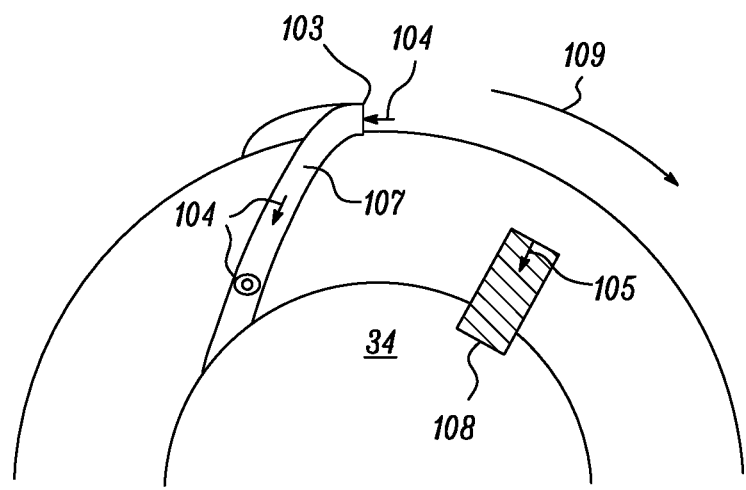
FIG. 5 is a schematic view of the lubrication arrangement along an axis of rotation of the carrier.

FIG. 5 is a schematic illustration of the lubrication arrangement shown in FIG. 4, from an axial direction. The direction of rotation 109 of the scoop 103 attached to the carrier 34 may be such that oil in the sump of the gearbox is forced into the secondary flow opening with enough pressure to overcome centrifugal forces that will tend to inhibit radially. In addition or alternatively, the cross sectional area of the oil channel 102 may be greater than that of the secondary oil channel 107 so that centrifugal forces acting on the oil in the oil channel 107 to force oil radially outward will overcome forces acting on the oil in the secondary oil channel 107. With an appropriate design, the oil flowing in the oil channel 102 may effectively "siphon" oil along the secondary oil channel against centrifugal forces in the secondary oil channel 107.

Figure 6:
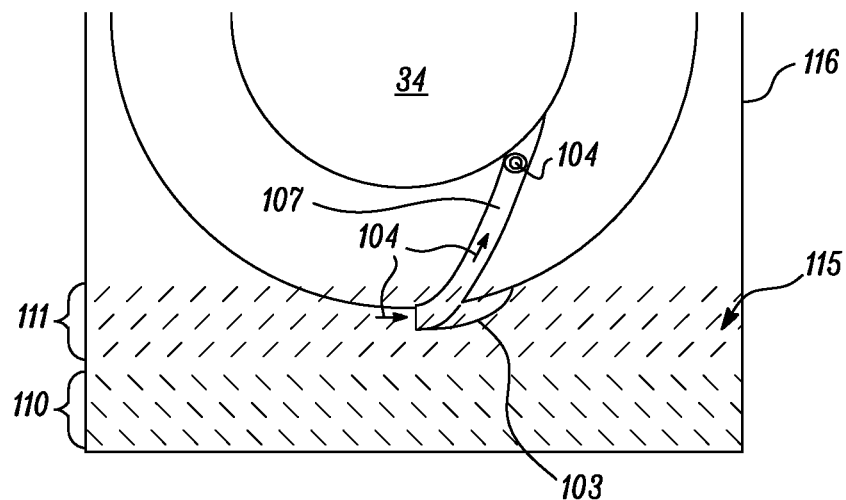
FIG. 6 is a schematic side view of the gearbox and sump (along an axis of rotation thereof), showing an oil level at which the secondary lubrication system is functional.

FIG. 6 illustrates the gearbox housing 116, which provides a sump for oil collection at the bottom portion thereof. During normal operation of the gearbox, the oil level is at a first, normal, range of levels 110. While the oil is at a normal range of levels 110 the scoop 103 will be clear of the normal oil level in the sump, so that no secondary oil flow 104 is provided to the bearings, and no additional losses are caused by the scoop 103 dragging in the oil. Certain embodiments are configured to increase the oil depth in the sump in response to a failure of the primary oil flow 105 (e.g. resulting from a loss of primary oil pressure), to a second range of levels 111, at which the scoop 103 dips into the oil and causes a secondary flow 104, to maintain lubrication of the bearings of the gearbox.

In some embodiments, the scoop 103 and/or secondary oil channel 107 may be dispensed with, and the dipping of at least a portion of the planet gear 32 or carrier 34 in the oil in the sump of the gearbox may be relied on as a secondary lubrication mechanism.

Figure 7:
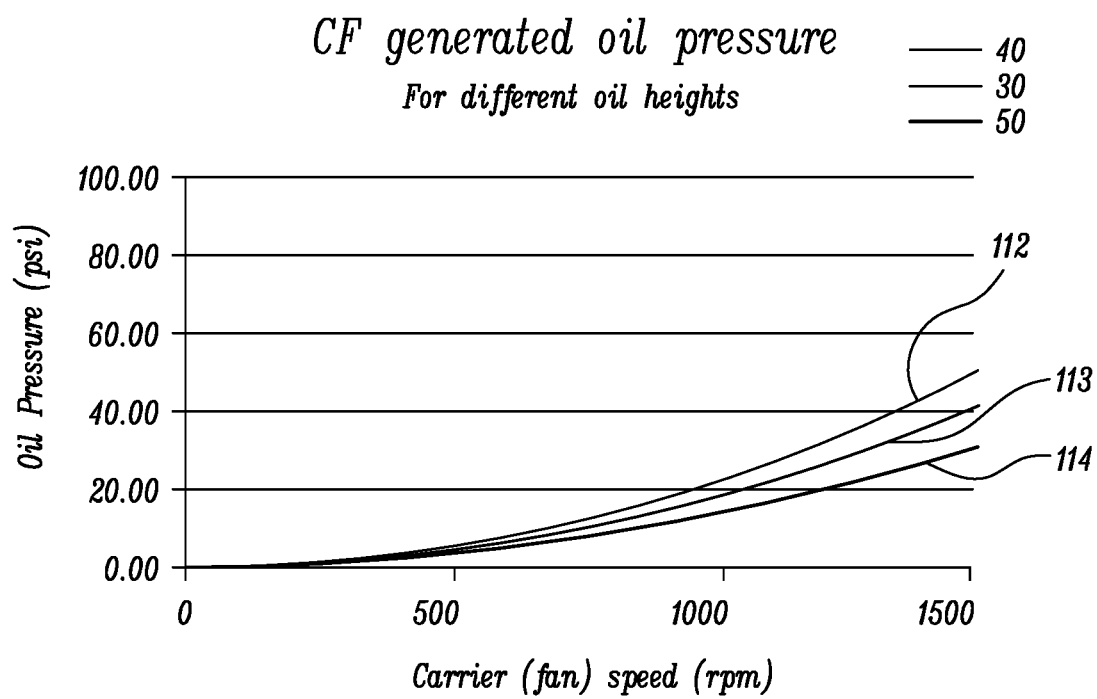
FIGS. 7 and 8 are graphs showing a predicted oil pressure resulting from secondary lubrication (as a result of carrier rotation)
Figure 8:
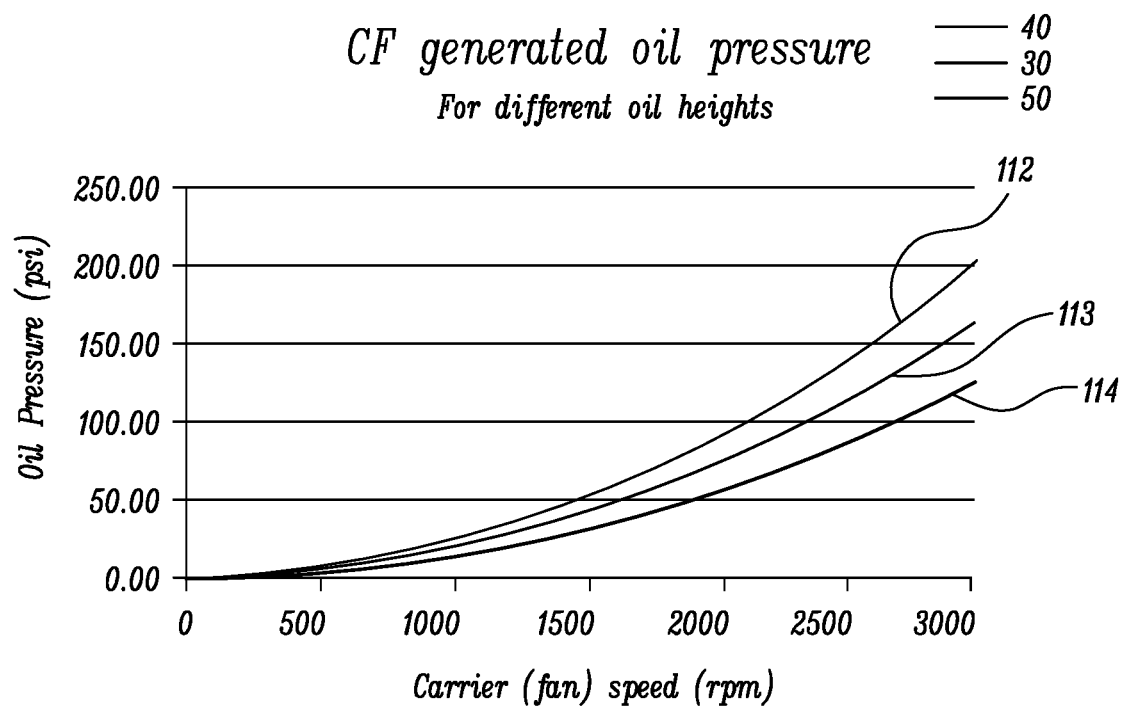

The oil pressure in the oil channel 102 resulting from the secondary oil flow 104 is illustrated in FIGS. 7 and 8 as a function of the carrier rotation speed. The graphs show curves 112, 113, 114, respectively corresponding with oil depths of 30 mm, 40 mm and 50 mm in an example embodiment. As the carrier 34 rotates more quickly, the oil pressure resulting from secondary oil flow 104 increases. As the depth of oil in the sump increases, the pressure also increases.

FIGS. 9 to 13 show an example of a lubrication system according to an embodiment in various states. The embodiment includes an oil tank 124, from which oil is pumped to lubricate turbomachinery 117, and a gearbox 30.

A gearbox primary feed 105 is pumped by gearbox primary feed pump 142 to the gearbox 30. Oil is pumped from the gearbox 30 to the oil tank 124 along the gearbox scavenge flow 129 by a gearbox scavenge pump 143. Both the gearbox primary feed pump 142 and the gearbox scavenge pump 143 are powered by an accessory gearbox 141. The accessory gearbox 141 may derive mechanical power from rotation of the core of the gas turbine engine.

A turbomachinery feed 118 is pumped by turbomachinery feed pump 122 to the turbomachinery (comprising a turbine and/or compressor of the engine core). Oil is pumped from the turbomachinery 117 to the oil tank 124 along the turbomachinery scavenge flow 119 by turbomachinery scavenge pump 123. Both the turbomachinery feed pump 122 and the turbomachinery scavenge pump 123 are powered by the accessory gearbox 141.

The turbomachinery pumps 122, 123 and the gearbox pumps 142, 143 may be driven together, as a single set of pumps, by the accessory gearbox 141. Alternatively the turbomachinery pumps 122, 123 may be driven as a set, and the gearbox pumps 142, 143 may be driven as a separate set.

The turbomachinery feed pump 122 and gearbox primary feed pump 142 may be independent and separable items of equipment. The scavenge pumps 123, 143 may be independent and separable items of equipment.

A gearbox scavenging controller 130 is provided to control the gearbox scavenge flow 129. The controller 130 comprises a gearbox scavenge valve 131, a gearbox scavenge control valve 132 and a flow restrictor 134. The gearbox scavenge control valve 132 is solenoid operated, and is thereby controlled by an electronic signal, which may originate from an engine controller (EEC).

In an open position, which may correspond with the solenoid being inactivated, the gearbox scavenge control valve 132 communicates oil pressure from the primary feed 105 to a control port of the gearbox scavenge valve 131. In a closed position, which may correspond with the solenoid being activated, the gearbox scavenge control valve 132 blocks oil pressure from being communicated from the primary feed 105 to the control port of the gearbox scavenge valve 131.

A flow restrictor 134 connects the control port of the gearbox scavenge valve 131 to the gearbox scavenge flow path 129, so that in the event the gearbox scavenge control valve 132 is closed, the pressure at the control port will equalise with that of the gearbox scavenge flow path 129, resulting in closing of the gearbox scavenge valve 131.

The gearbox scavenge valve 131 has an open position, in which oil flows through the gearbox scavenge path 129 to return to the oil tank 124, and a closed position, in which oil is blocked from returning to the oil tank 124 from the gearbox 30 through the gearbox scavenge path 129. The gearbox scavenge valve 131 is urged into the open position by the pressure of the primary gearbox feed 105, and a spring urges the valve 131 into the closed position.

Crossover flow valve 133 is provided, which is configured to block crossover flow 134 from the turbomachinery feed 118 to the gearbox 30 in a closed position, and to communicate crossover flow 134 from the turbomachinery feed 118 to the gearbox 30 in an open position. In the example embodiment, the turbomachinery feed 118 is connected to a port of the crossover flow valve 133 via a flow restrictor 120, but this is not essential. The crossover flow valve 133 is urged into the closed position by the pressure of the primary gearbox feed 105 (which may be connected to a control port of the crossover valve 133), and a spring urges the crossover valve 133 into the open position. In some embodiments, the control port of the crossover flow valve 133 may be connected to the line between the gearbox scavenge control valve 132 and the gearbox scavenge valve 131, so that operation of the solenoid will close or open the crossover flow valve 133 as required.

Both the gearbox scavenge valve 131 and the crossover flow valve 133 are "fail-safe", in that in a failure condition the spring will urge the valves into a safe position that tends to secure a supply of oil to the gearbox.

The table shown in FIGS. 15 and 16 describe the states of the system, with particular states illustrated in FIGS. 9 to 13.

Figure 9:
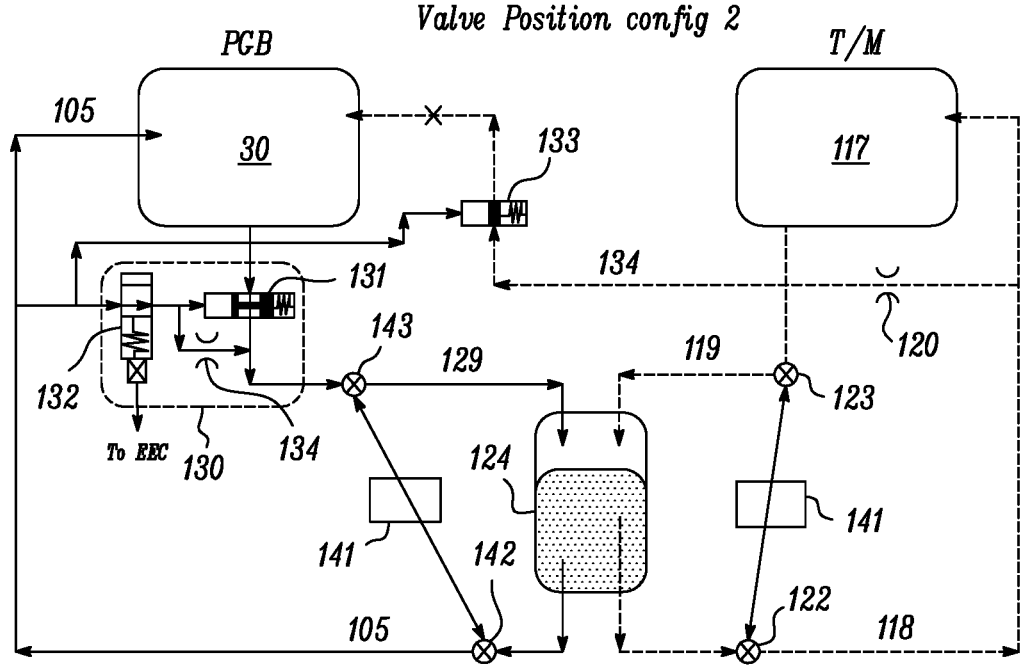
FIGS. 9 to 13 are schematic illustrations of a lubrication system according to an embodiment in various states.

FIG. 9 shows the system during normal (e.g. cruise) operation, during which the positions of the valves 131, 133 are termed "configuration 2". In normal operation the pressure in the gearbox feed 105 is sufficient to cause the crossover flow valve 133 to be in the closed position, blocking crossover flow 134. The gearbox 30 is supplied with oil from the primary feed 105, and the turbomachinery 117 is supplied with oil from the turbomachinery feed 118. The pressure in the gearbox feed 105 is also sufficient to keep the gearbox scavenge valve 131 in the open position. The result of this is that the oil level in the sump of the gearbox is maintained at a level that is too low for the secondary oil system (in which oil is provided from the sump to the gearbox) to function or to cause any losses (because it is clear of the oil in the sump).

Figure 10:
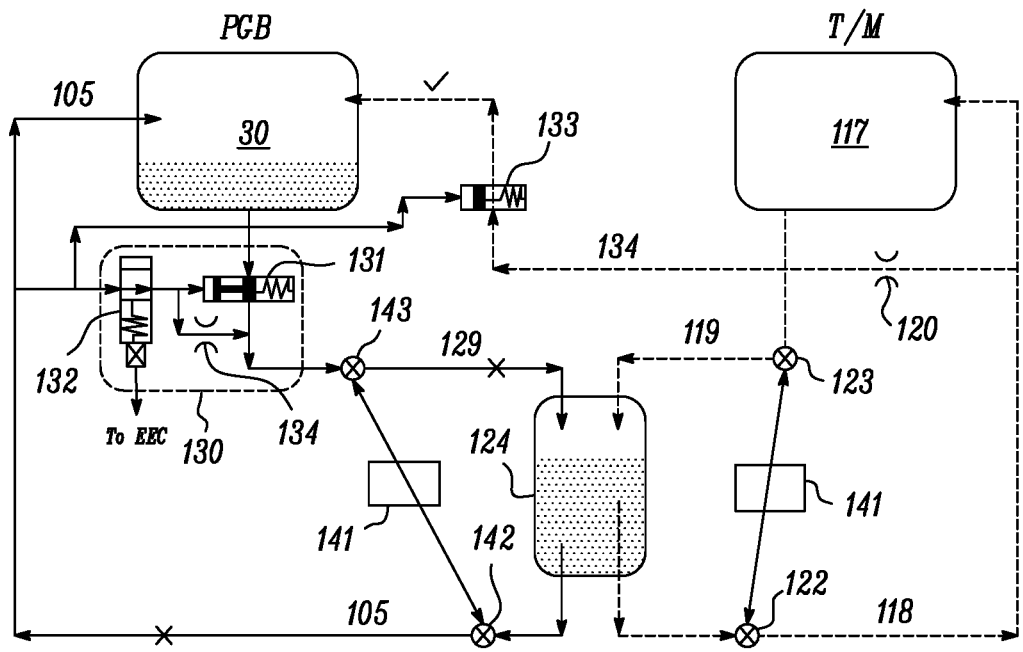

FIG. 10 shows the system in a state in which the gearbox primary oil feed 105 has failed, for example as a result of a failure of the gearbox primary feed pump 142 or as a result of a leak in the gearbox primary feed 105. The pressure in the gearbox primary feed 105 will consequently be low. This will result in automatic opening of the crossover flow valve 133 and automatic closing of the gearbox scavenge valve 131 (the gearbox scavenge control valve 132 being normally open). This is valve configuration 1.

The crossover flow 134 from the turbomachinery feed 118 (provided via the crossover flow valve 133) will increase the oil level in the gearbox 30, because the gearbox scavenge valve 131 is in the closed position. The level of the feed from the oil tank 124 for the turbomachinery feed 118 may be higher than the level of the feed from the oil tank for the primary feed 105, so that turbomachinery oil pressure is lost before primary feed pressure is lost.

Figure 11:
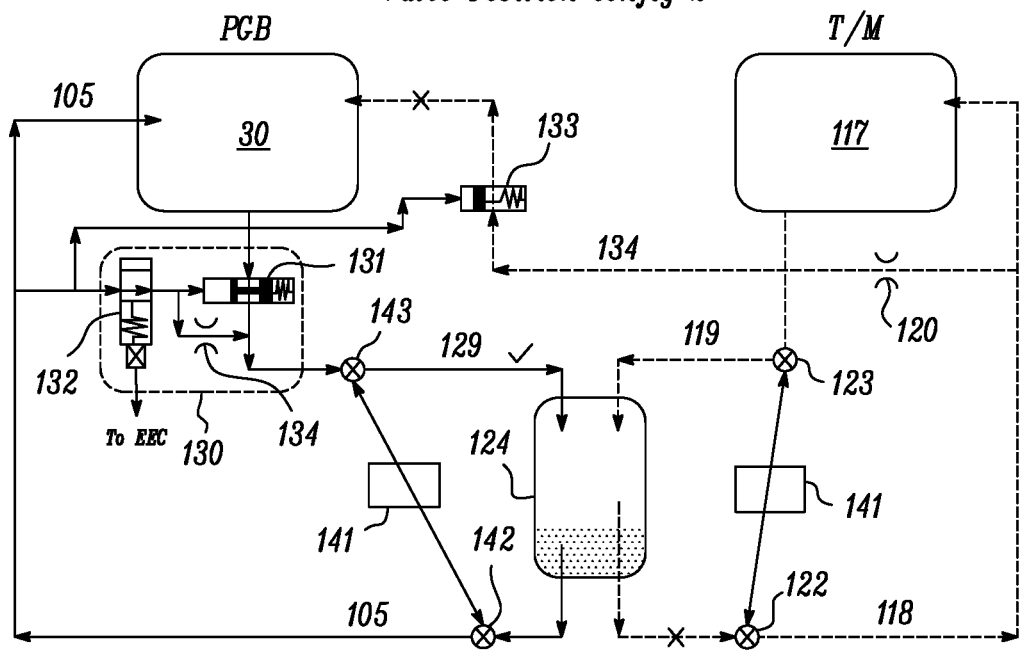

FIG. 11 shows the system in a state in which the turbomachinery feed 118 has failed, for example as a result of a failure of the turbomachinery feed pump 122 or as a result of a leak in the turbomachinery feed 118. The gearbox oil supply continues to operate normally. This position of the valves is configuration 2.

Figure 12:
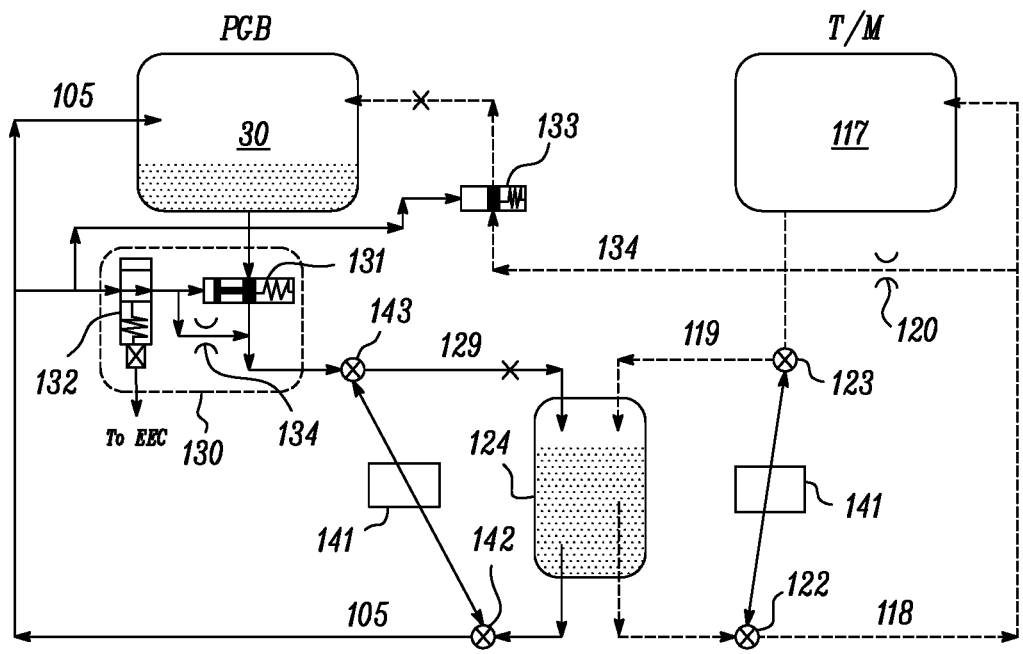

FIG. 12 shows the system in a state corresponding with an in-flight shutdown (not due to an oil system failure). In this situation the solenoid of the gearbox scavenge control valve 132 is activated to close the gearbox scavenge control valve 132, with the result that the gearbox scavenge valve 131 is also closed. The continued rotation during run-down of the core (and hence of the accessory gearbox) will result in adequate pressure in the primary gearbox feed 105 to keep the crossover valve 133 closed. This is valve configuration three.

The oil systems for both the gearbox 30 and turbomachinery will continue to function during run down. The shutoff of the gearbox scavenge path 129 during engine shutdown results in the oil level in the gearbox 30 increasing during shutdown to a level sufficient for the secondary oil flow to function, enabling provision of oil to the gearbox 30 during windmilling (see FIG. 13).

Figure 13:
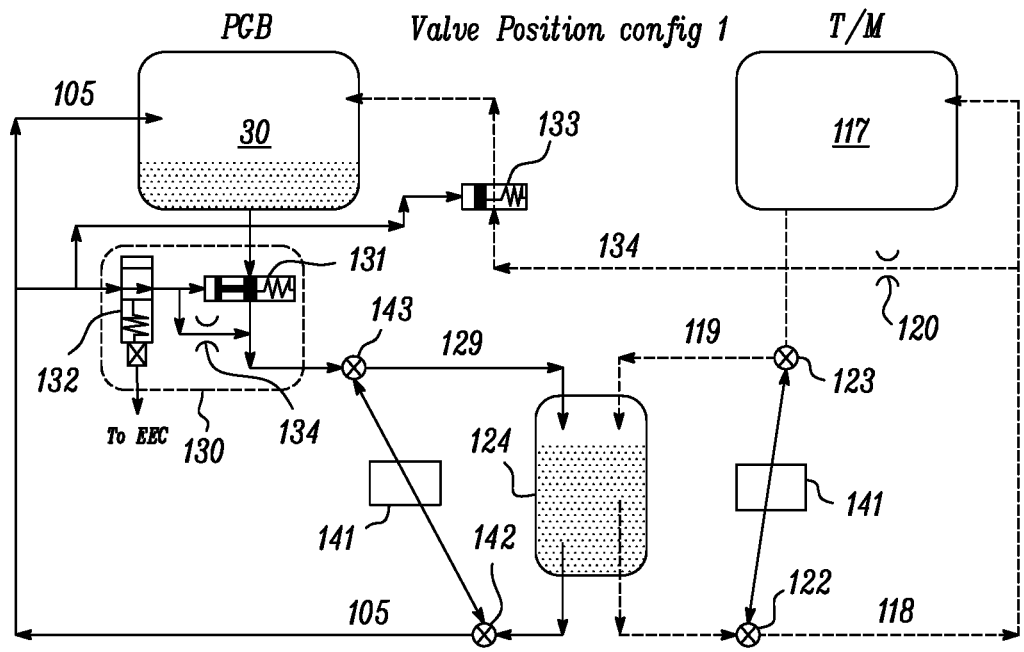

FIG. 13 shows the system in a state corresponding with the engine windmilling in flight after shutdown. The valves are in configuration 1. The gearbox will be supplied with secondary oil flow due to the level of oil already present in the gearbox 30. Depending on the speed of rotation of the engine core, the pressure in the primary gearbox feed 105 may not be sufficient to hold the gearbox scavenge valve 131 fully open, or to hold the crossover flow valve 133 fully closed. Some rotation of the core may result in sufficient speed of rotation of the accessory gearbox 141 to provide some flow/pressure in the turbomachinery oil feed 118 and primary gearbox feed 105 (as described in FIG. 15).

Increasing the level of oil in the gearbox only in response to a failure of the primary gearbox lubrication system minimises losses during normal operation. Systems according to some embodiments may provide for a redundant supply of oil to the gearbox that provides a supply of oil under various failure conditions until the engine has been safely shut down, avoiding damage to gearbox bearings. The lubrication provided by certain embodiments avoids wear and damage to the bearings of the gearbox, and thereby reduce the frequency of engine refits, and the associated cost and down time. Certain embodiments also operate automatically as a fail-safe system.

FIGS. 15 and 16 include a table of various conditions and the corresponding operating status of a fuel system according to an embodiment. With the engine static (i.e. nothing rotating), the system is in valve configuration 1, with the gearbox scavenge valve 131 closed, and the crossover flow valve 133 open. During starting, the system will transition from valve configuration 1 to configuration 2, as the gearbox primary feed 105 is pressurised, which will cause the gearbox scavenge valve 131 to open and the crossover flow valve 133 to close. Gulp on starting may be increased due to flow through the crossover flow valve 133 into the gearbox sump, and limited return through the gearbox scavenge valve 131.

During normal running, the system will be as shown in FIG. 9, and already described above.

In the event of a failure of gearbox feed pump failure, the pressure in the gearbox primary feed 105 will drop, resulting in valve configuration 2, as described with reference to FIG. 10.

In the event of a gearbox scavenge pump 143 failure, oil will accumulate in the gearbox 30. This may eventually consume all the oil, which may result in a loss of pressure to the turbomachinery feed 118.

A slow oil leak from the gearbox feed 105 is likely to not to cause sufficient pressure drop in the gearbox primary feed 105 to operate the crossover and gearbox scavenge valves 133, 131, and will therefore eventually lead to a loss of oil pressure in turbomachinery oil pressure, resulting in engine shutdown.

A fast oil leak from the gearbox feed 105 will cause a drop in pressure that is sufficient to transition to valve configuration 1. This situation will cause a "race" between oil loss from the gearbox primary feed 105, valve response, and depletion from the oil tank 124 below the take-off position for the turbomachinery feed 118 (see FIG. 14).

A leak in the turbomachinery side (in either feed 118 or scavenge 119) will not affect the gearbox 30, provided the take-off position for the turbomachinery feed 118 is above that for the primary gearbox feed 108 in the oil tank 124. This situation therefore leaves the valves in configuration 2, as shown in FIG. 11.

Loss from the oil tank 124 produces the same situation as a leak from the gearbox primary feed 105 (fast or slow).

An in-flight shutdown corresponds with the state described with reference to FIG. 13, with the valves in configuration 3.

Windmilling of the engine will not produce sufficient pressure in the gearbox feed 105 to keep the valves in configuration 2, so they will transition back to the fail-safe configuration 1. The extent of any gearbox primary feed flow, turbomachinery feed flow and crossover flow will depend on the speed of core windmilling.

A shutdown will result in a transition from valve configuration 2 to configuration 1 as pressure in the gearbox primary feed 105 is reduced. A failure of drive from the accessory gearbox will look like a shutdown, as will a flameout. In flight starting (either windmill or starter assisted) will look like a ground start.

Figure 14:
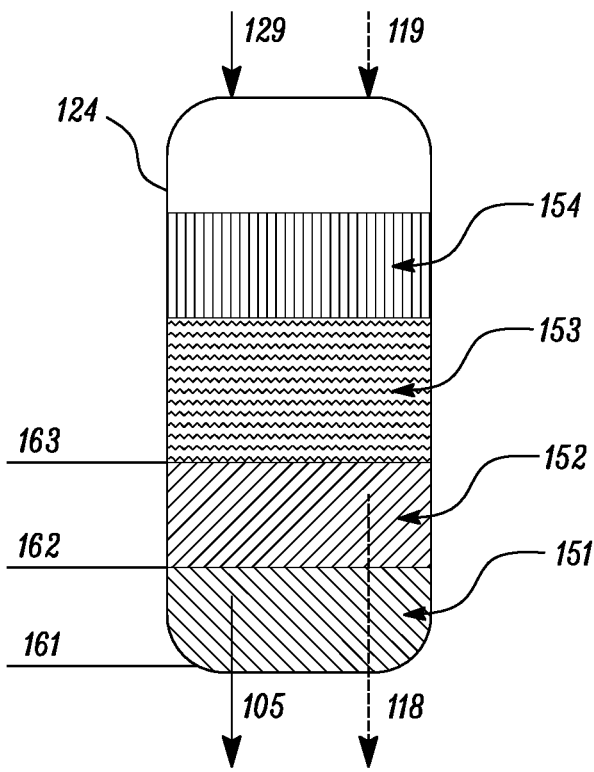
FIG. 14 is a schematic of an oil tank illustrating the different portions of oil within the tank and some oil levels of interest.

FIG. 14 illustrates the oil tank 124, with oil levels 161, 162, 163 respectively corresponding with: a zero tank contents indication, a loss of turbomachinery oil pressure, a loss of gearbox oil pressure. The turbomachinery feed 118 is taken from level in the tank 124 that corresponds with level 162, which is higher than level 161, so that the turbomachinery feed 118 loses oil supply before the gearbox primary oil feed 105, which is supplied from level 161. In the event of a failure leading to oil loss (without affecting the pumps 142, 143, 122, 123), turbomachinery oil pressure/flow is therefore lost before the gearbox oil pressure/flow is lost.

Different regions of the oil tank 124 can be thought of as associated with an oil quantity that serves a different purpose. Region 151 is the quantity of oil between turbomachinery loss of supply and gearbox loss of supply, and is sufficient to provide a minimum of five minutes lubrication to the gearbox 30. Region 151 may be between 1 and 3 litres in volume. Region 152 is the gulp allowance associated with transient/go around engine events. There should be at least this much oil in the tank to ensure that the turbomachinery is lubricated. Region 153 is useable oil. A typical maximum oil use rate may be between 0.2 and 0.6 litres per hour. Region 154 is the gulp allowance from start-up to idle.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A lubrication system for a gas turbine engine, the system comprising:
a planetary gearbox, the planetary gearbox comprising
a carrier,
an oil channel, and
a sump;
an oil tank;
a primary gearbox lubrication system including a primary oil jet in fluid communication with the oil channel of the planetary gearbox via a first opening, the primary gearbox lubrication system configured to pump oil from the oil tank to lubricate the gearbox with a gearbox primary feed;
a secondary gearbox lubrication system including a secondary oil channel disposed inside of the carrier, the secondary oil channel in fluid communication with the oil channel of the planetary gearbox via a second opening at a first end of the secondary oil channel, configured to lubricate the gearbox with oil from the sump when the oil level in the sump reaches a predetermined level;
a crossover flow valve upstream of the gearbox; and
a scoop attached to the secondary oil channel at a second end of the secondary oil channel, the scoop attached to a rotating part of the gearbox,
wherein the crossover flow valve is configured to increase the oil level in the sump to at least the predetermined level in response to a failure of the primary gearbox lubrication system.

2. The lubrication system of claim 1, further comprising: a gearbox primary feed pump configured to pressurise the gearbox primary feed with oil from the oil tank; and a gearbox scavenge pump configured to pump oil from the gearbox sump to the oil tank along a scavenge flow.

3. The lubrication system of claim 2, further comprising a gearbox scavenge valve that has an open position, in which oil flows through a gearbox scavenge path to return to the oil tank, and a closed position, in which oil is blocked from returning to the oil tank from the gearbox through the gearbox scavenge path, wherein the gearbox scavenge valve is configured to close in response to the pressure of the gearbox primary feed falling below a predetermined level.

4. The lubrication system of claim 3, further comprising a gearbox scavenge control valve with an open position in which the gearbox scavenge control valve communicates oil pressure from the gearbox primary feed to a control port of the gearbox scavenge valve and a closed position in which the gearbox scavenge control valve blocks oil pressure from being communicated from the gearbox primary feed to the control port of the gearbox scavenge valve.

5. The lubrication system of claim 4, wherein the gearbox scavenge control valve is operable to switch between the open and closed positions in response to an electronic signal.

6. The lubrication system of claim 1, further comprising a turbomachinery lubrication system configured to lubricate turbomachinery of the gas turbine engine with a turbomachinery feed; wherein the lubrication system is configured to supply a crossover flow from the turbomachinery feed to increase the oil level in the sump in response to a failure of the primary gearbox lubrication system, wherein a portion of the turbomachinery feed is diverted to the sump in response to a failure of the primary gearbox lubrication system.

7. The lubrication system of claim 6, further comprising: a turbomachinery feed pump configured to pressurise the turbomachinery feed with oil from the oil tank and a turbomachinery scavenge pump configured to pump oil from the turbomachinery to the oil tank along a turbomachinery scavenge flow.

8. The lubrication system of claim 6, further comprising the crossover flow valve configured to block crossover flow from the turbomachinery feed to the gearbox in a closed position, and to communicate the crossover flow from the turbomachinery feed to the gearbox in an open position; wherein the crossover valve is configured to open in response to the pressure of the gearbox primary feed falling below a predetermined level.

9. The lubrication system of claim 1, wherein the planetary gearbox, further comprises a ring gear, a sun gear and at least two planet gears supported for rotation by planet gear bearings.

10. The lubrication system of claim 9, wherein the oil channel of the planetary gearbox is configured to receive gearbox primary oil feed and a secondary oil feed from the secondary oil channel at a first location, and to provide oil to a planet gear bearing at a second location, wherein the second location is radially further from an axis of rotation of the carrier than the first location.

11. A gas turbine engine for an aircraft comprising:
an engine core comprising a turbine, a compressor, and a core shaft connecting the turbine to the compressor;
a fan located upstream of the engine core, the fan comprising a plurality of fan blades;
a lubrication system according to any preceding claim, wherein the gearbox receives an input from the core shaft and outputs drive to the fan so as to drive the fan at a lower rotational speed than the core shaft.

12. The gas turbine engine of claim 11, wherein:
the turbine is a first turbine, the compressor is a first compressor, and the core shaft is a first core shaft;
the engine core further comprises a second turbine, a second compressor, and a second core shaft connecting the second turbine to the second compressor; and
the second turbine, second compressor, and second core shaft are arranged to rotate at a higher rotational speed than the first core shaft.

13. The lubrication system of claim 1, wherein the scoop is configured to collect oil from the sump of the gearbox when the oil level in the sump is deep enough for the scoop to reach the oil.

14. A method of lubricating a planetary gearbox of a gas turbine engine, the method comprising:
lubricating a journal bearing of the planetary gearbox with oil from a primary gearbox oil feed via an oil channel, wherein the primary gearbox oil feed is provided to the oil channel by a primary oil jet, the oil channel in fluid communication with the primary oil jet via a first opening;
in response to failure of the primary gearbox oil feed, causing an oil level in a sump of the planetary gearbox to increase; and
lubricating the journal bearing of the planetary gearbox with oil from the sump when the level has reached or exceeded a predetermined level, the oil from the sump fed to the journal bearing via a secondary oil channel in fluid communication with the oil channel by a second opening, the secondary oil channel disposed in a carrier of the planetary gearbox, wherein a scoop in direct fluid communication with the secondary oil channel feeds the oil from the sump to the secondary oil channel, wherein the scoop is attached to a rotating part of the gearbox and collects the oil from the sump.

15. The method of claim 14, wherein lubricating the planetary gearbox comprises splash feeding the oil onto the journal bearing of the planetary gearbox.

16. The method of claim 14, wherein causing an oil level in the sump to increase comprises operating at least one valve to reduce an oil scavenge flow from the planetary gearbox and/or to provide an additional oil flow to the planetary gearbox.

17. The method of claim 16, wherein the additional oil flow to the gearbox originates from an oil pump that does not pressurize the primary gearbox oil feed.

18. The method of claim 14, wherein causing an oil level in the sump to increase comprises diverting oil from a turbomachinery lubrication system to the planetary gearbox.

19. The method of claim 14, comprising using a lubrication system to perform the method, wherein the system comprises:
the planetary gearbox, the planetary gearbox comprising the sump;
an oil tank;
a primary gearbox lubrication system configured to pump the oil from the oil tank to lubricate the planetary gearbox with the primary gearbox oil feed;
a secondary gearbox lubrication system, wherein the secondary gearbox lubrication system lubricates the journal bearing of the planetary gearbox with the oil from the sump when the oil level in the sump reaches the predetermined level; and
a crossover flow valve upstream of the gearbox,
wherein the crossover flow valve causes the oil level in the sump to increase to at least the predetermined level in response to a failure of the primary gearbox lubrication system.

* * * * *